Figure 1:
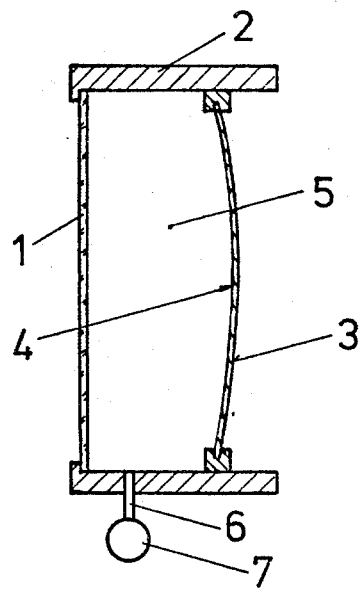

United States Patent [19]
Cobarg

[11] 3,972,600
[45] Aug. 3, 1976

[54] MIRROR WITH ADJUSTABLE FOCAL DISTANCE

[75] Inventor: Claus Christian Cobarg, Steinbach, Germany

[73] Assignee: Braun Aktiengesellschaft, Kronberg, Taunus, Germany

[22] Filed: Nov. 12, 1973

[21] Appl. No.: 414,980

[30] Foreign Application Priority Data
Nov. 15, 1972 Germany............................ 2255937

[52] U.S. Cl. .............................................. 350/295
[51] Int. Cl.² ........................................... G02B 5/10
[58] Field of Search.................... 350/288, 293, 295; 240/44.1, 103 A

[56] References Cited
UNITED STATES PATENTS

| 3,031,928 | 5/1962 | Kopito | 350/295 |
| 3,254,342 | 5/1966 | Miller | 350/295 |
| 3,580,082 | 5/1971 | Strack | 350/295 |

Primary Examiner—Davis L. Willis
Attorney, Agent, or Firm—Ernest F. Marmorek

[57] ABSTRACT

A mirror is provided having an adjustable focal length. The mirror includes a tubular frame in which is mounted a pair of end walls, either one or both of which may be transparent, and an internal, flexible wall that divides the frame member into two separate chambers. Where one transparent end wall is provided, the flexible, internal wall has a single reflecting surface in opposition thereto. Where two transparent end walls are provided, the flexible internal wall has two oppositely facing reflecting surfaces. A conduit provides direct communication between both chambers and a reversible pump is in communication with said conduit for selectively producing controllable pressures in the two chambers.

3 Claims, 11 Drawing Figures

U.S. Patent  Aug. 3, 1976  Sheet 3 of 3  3,972,600
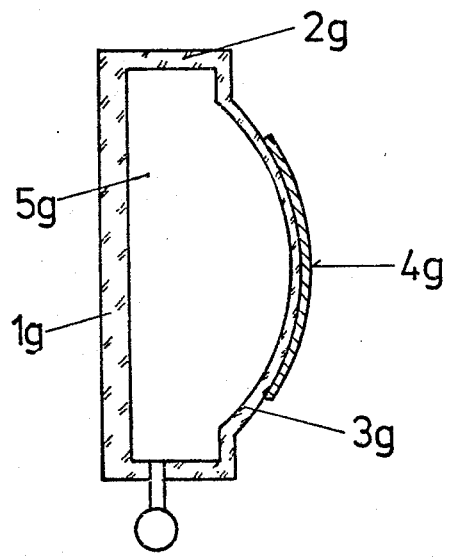
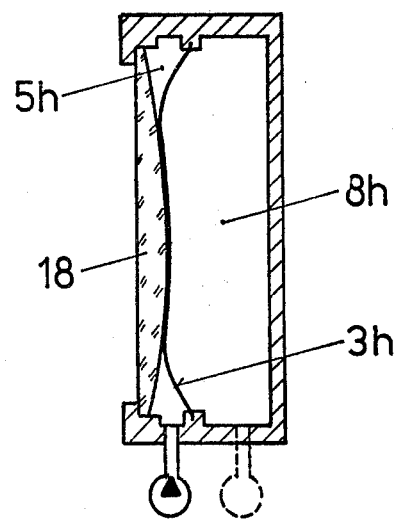
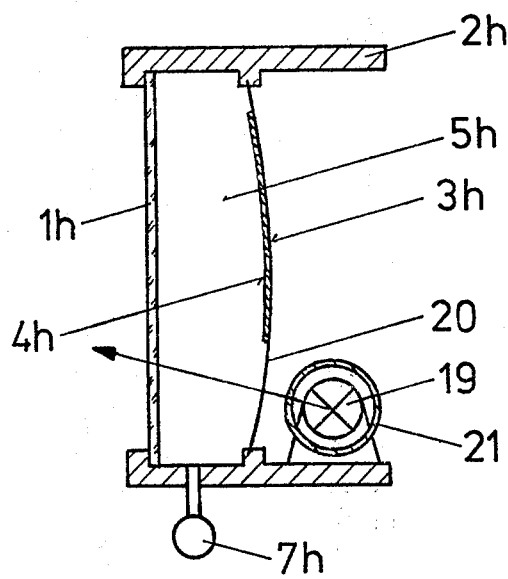

MIRROR WITH ADJUSTABLE FOCAL DISTANCE

The invention relates to a mirror having an adjustable focal length especially to a cosmetic or automobile mirror having two walls spaced with respect to each other at a distance and extending in planes running parallel with respect to each other and which are connected over their edges directly or by a frame portion and which enclose a hollow space and in which one of the walls is provided with a reflecting surface and in which one of the wall surfaces is deformable and wherein means are provided for the making of a controlled variable pressure in the hollow space, such as by a pump the suction or pressure channel of which terminates in the hollow space.

Reflecting surfaces from elastically deformable metal foils and also from elastically deformable synthetic foil material coated with an appropriate metal, such as preferably aluminum, are known.

A cosmetic mirror having an adjustable focal length is also known (Swiss Pat. No. 498,405), in which a uniformly tensioned and elastically deformable, reflecting foil forms at least partially one of the walls of a closed space otherwise surrounded with rigid walls, and in which one of the rigid wall means for producing a variable vacuum in the closed space are secured in order to adjust the focal length of the mirror. This cosmetic mirror has the disadvantage that its elastically deformable reflecting wall is facing the observer without being covered. The practice proved that the foil in the daily use of the mirror becomes quickly soiled and it is practically impossible to remove the dirt layer therefrom without damaging the foil itself or at least destroying its desired symmetrical form.

There is also known (from the magazine *Film and Sound*, April, 1966) an experimental device in which a foil secured in a frame and coated with aluminum is sealed air-tight on its back side by a housing. By pumping air into the back side of the air-tight hollow space, the foil becomes arched outwardly in the direction of the observer and provides thereby a reducing mirror. Such experimental device has among others, the disadvantage that the sensitive foil carrying the mirror surface becomes quickly soiled and it can hardly be cleaned.

The present invention has the object to provide a mirror of the above-type which, however, is easy to handle and the focal length of which can be easily adjusted and which can be easily cared for and which is robust and insensitive and which can be economically produced and the mirror or reflecting surface of which retains, in a constant manner, the focal length which has been set until the new adjustment is made. The mirror must be constructed in such a manner that the sensitive mirror or reflecting surface could be kept completely dust-free, even after having been used for many years.

This is attained, according to the present invention, in that the reflecting surface or mirror layer is arranged on a wall which is facing the inside of the space and in which at least one wall is made from a transparent material, such as glass or a synthetic material. The mirror layer is also constructed in such a manner that the reflected light rays fall through the hollow space.

Preferably, the mirror layer which, for example, is made from an elastic foil is arranged between wall 1 made from a transparent material and a further, deformable wall 3 made, for example, from metal or glass, wherein the mirror layer is provided on the deformable wall and in which means are provided for example, a pump for producing an excess air pressure or vacuum in the hollow space between the deformable wall and wall 1 in a controlled manner.

In a preferred embodiment the deformable wall which, for example, is a foil and the wall 3 which for example, is made from metal, are connected over their (radially outward) edges directly, and in which the deformable wall is coupled with wall 1 made from the transparent material over a frame portion made from an elastically deformable material, such as from an elastomar, and wherein means are provided, for example a pump in order to produce in the hollow space between wall 1 and wall 3 a controlled pressure.

Instead of a pump which sucks the air out from the surrounding atmosphere, one may provide an arrangement which pumps the pressure medium for example, gas, from one of the hollow spaces into another hollow space of the mirror. In this case the hollow space between the deformable wall and wall 1 from the transparent material and the hollow space between the deformable wall and the wall 3 are coupled over a conduit for the pressure medium, for example, a hose conduit or they are coupled through a pressure conduit on the frame of the mirror and in which into such pressure coupling means the means for producing the controllable pressure which can be a pump with a reversable delivery direction is connected.

In order to make sure that on the path over the pump no dirt particles will reach the hollow space between the glass wall and the deformable wall carrying the mirror layer, the invention provides that into the pressure conduit or channel serving for the producing of the controllable pressure a means for the filtering of the medium flowing back and forth, which can be air, is provided.

In order to compensate for any imaging errors produced by the deformable mirror layer, if any, in one of the embodiments the wall made from the transparent material, which can be glass, is not formed as a parallel disc, but it is formed as an optical lens, for example, as a diverging lens, a collector lens or a Fresnel lens.

Another possibility provided for preventing the light rays reflected by the mirror layer for producing a disrupted image, is that the deformable wall which contains the mirror layer is formed with variable thickness so that the wall thickness in the center or at the center of the gravity of the surface is different from the wall thickness at the edge zones so that when the pressure is varied in the hollow space the deformable wall will assume an aspheric form.

In a very important embodiment the walls which enclose the hollow space, for example the wall made from the transparent material, the frame portion and the deformable wall are formed integrally and are made, for example from a transparent material. Preferably, the deformable wall which is arranged between the glass wall and the wall 3 is provided on its circumferential edges or on its shorter sides with a bulge, profile ring or a membrane seal made from an elastomar projecting outwardly from the plane of the wall and surrounding the wall and the outer circumferential smaller side of which is securely coupled with the frame member and performs or allows a shifting of the wall under the influence of the pressure changes in the hollow space in the direction of the glass wall or in the direction towards the wall 3.

As an advantage the deformable wall is arranged with respect to the glass wall at such a distance that under the influence of the pressure in the hollow space in front or behind the wall it will lie against the glass wall which, for example, can be made as an optical lens and will partially or completely adjust itself to the upper surface shape thereof.

Figure 2:
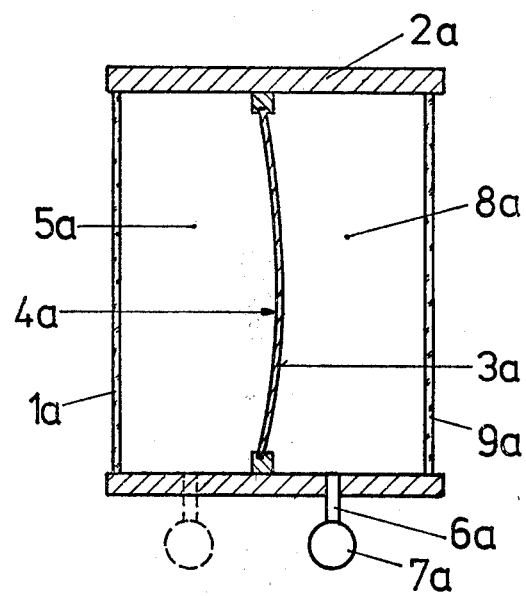
Figure 3:
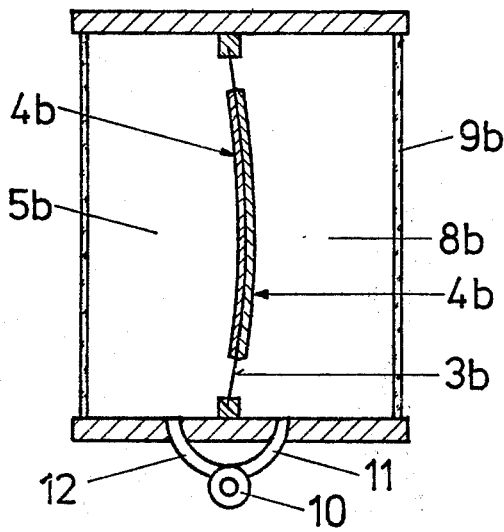
Figure 4:
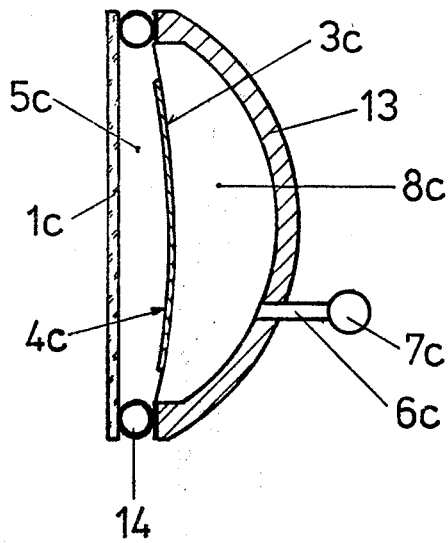
Figure 5:
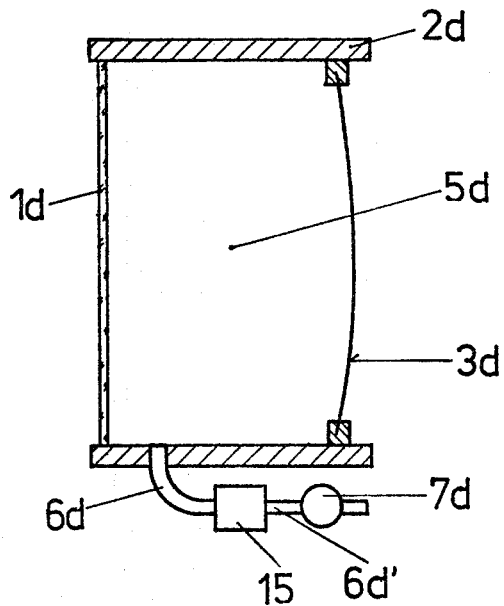
Figure 6:
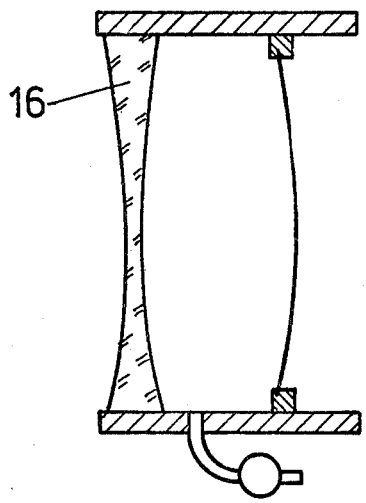
Figure 7:
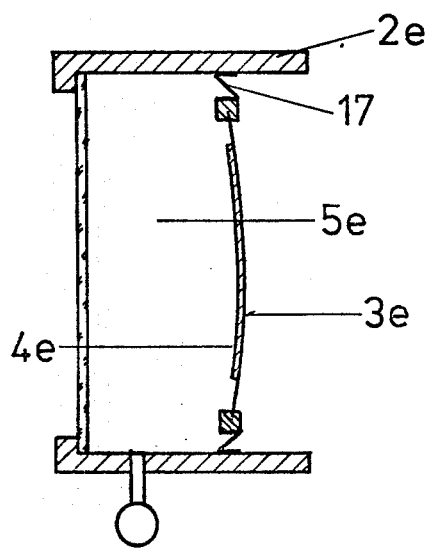
Figure 8:
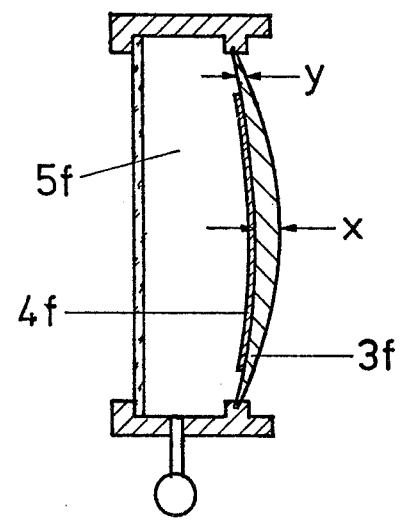

The invention provides for various possibilities of construction some of which are illustrated in the attached drawing, which show:

FIG. 1 — illustrates the principle of the structuring of a mirror in which the hollow space, located between the deformable wall and the glass disc is connected to a pump;

FIG. 2 — illustrates a mirror having a second hollow space located behind the deformable wall when viewed in the direction of observation;

FIG. 3 — illustrates the mirror according to FIG. 2 in which, however, the conduits of the pump are coupled to the hollow space before the mirror layer and to the hollow space behind the mirror layer;

FIG. 4 — illustrates a mirror in which the frame portions lying between the glass wall and the foil carrying the mirror layer is constructed from a rubber profile ring;

FIG. 5 — illustrates a mirror similar to the one of FIG. 1, in which, however, the pressure conduit of the pump leading to the hollow space contains a filter;

FIG. 6 — illustrates a mirror similar to the one in FIG. 1 but having an optical lens;

FIG. 7 — illustrates a mirror similar to the one in FIG. 1, in which, however, the mirror support is in the form of a profile ring;

FIG. 8 — illustrates a mirror according to FIG. 1, in which the deformable wall is constructed with variable thickness;

FIG. 9 — illustrates a mirror according to FIG. 1 in which, however, the walls surrounding the hollow space are made from the same-type of material;

FIG. 10 — illustrates a mirror similar to that of FIG. 2, in which, however, the transparent wall is an optical lens;

FIG. 11 — illustrates a mirror with illumination.

The mirror according to FIG. 1 consists of a plane parallel transparent lens plate 1, a cylindrical frame portion 2 which has the cylindrical shape as an example, and a foil 3 secured to the frame member 2 at its outer edges and onto which a mirror layer 4 is arranged in such a manner that it will reflect light rays which pass through the plate 1 in the direction onto the glass plate. The hollow space 5 which is enclosed by the deformable wall 3, the frame member 2 and the glass plate 1 is connected by a pipe or hose conduit 6 to a pump 7, which for example can be a hand pump. In order to attain that the deformable wall 3 having the mirror layer 4 thereon and which is a plane under the atmospheric pressure could become a concave mirror, with the help of the pump 7 air is pumped into the hollow space 5 so that the pressure present in the hollow space 5 becomes increased. Under the influence of the pressure the deformable wall 3 becomes arched as can be seen in the figure, outwardly, and to a greater extent if the pressure is higher in the hollow space 5. In order to attain again the initial position, that is, in order to attain that the deformable wall 3 having the mirror layer 4 thereon assumes again the plane shape, there is provided an exhaust valve not illustrated in detail on the drawing, and particularly on the frame member 2 in the conduit 6 or on the pump 7 itself.

The mirror according to FIG. 2 differs essentially with respect to the afore-described mirror in that behind the deformable wall 3a having the mirror layer 4a on it there is provided a second hollow space 8a which is enclosed by the frame member 2a and by a back wall 9a. The pump 7a in this case with the help of the pressure conduit 6a is connected to the hollow space 8a behind the deformable wall 3 and is formed as a vacuum pump, that is, when the pump is operated, it will suck out the air from the hollow space 8 at least partially, whereupon the deformable wall 3 will arch into the direction toward the back wall 9a, in such a fashion, that it forms a concave mirror, that is, the light rays falling through the glass disc 1a become reflected so that they will pass the glass plate 1a also for a second time. The pump 7a or the conduit 6a or the back wall 9a or the housing member 2a are provided with an exhaust valve not shown in detail which, when actuated will restore the atmospheric pressure again in the hollow space 8a. As it is shown in the drawing, the hollow space 5a can be connected also to the pump 7a, that is, to the pressure conduit 6a. In this case the pump 7a must operate as a pressure pump and be capable to provide an excess pressure in the hollow space 5a so that the deformable wall 3a could arch in the direction toward the back wall 9a and thereby perform a concave mirror. It is clear that also in this case the exhaust arrangement not shown in detail must be present also for the hollow space 5a. It is also possible, for example, in the case that the pump 7a is connected to the hollow space 5a, that the hollow space 8a is continuously connected with the atmosphere by means of an exhaust bore. In this case, however, it is hard to prevent that dirt particles will not reach the hollow space 8a after the mirror has been in a longer use.

In the embodiment illustrated in FIG. 3 a pump 10 having a reversible delivery direction is provided. One of the terminals 11 of which are connected to the hollow space 8b and the other terminal 12 of which is connected to the hollow space 5b. When the pump 10 is operated, then the medium present in the hollow space 8b becomes sucked out and delivered into the hollow space 5b, and vice versa. In the first case also the deformable wall 3b, as can be seen in the drawing, will arch while it will assume a plane wall shape when the pressure in space 5b corresponds to the pressure in space 8b. The illustrated embodiment enables also to operate with a two-sided mirror. In this case, the wall 9b must be also a glass wall and the deformable wall, that is, the foil 3b must be provided with a mirror layer 4b on both sides.

The mirror according to FIG. 4 consists of a cover-like back wall 13, a deformable wall 3c having a mirror layer 4c thereon, a profile ring 14, a glass plate 1c and a pump 7c having a pressure conduit 6c. The pump 7c in this case is a vacuum pump which is capable to suck out the medium from the hollow space 8c so that the deformable wall 3c will arch in the direction toward the member 13 and with its mirror layer 4c will form a concave mirror. The profile ring 14 which, for example, can be a rubber hollow profile will take care that the hollow space 5c between the glass plate 1c and the deformable wall 3c becomes sealed air-tight from the atmosphere surrounding the mirror so that no dust particles can penetrate into it and in order that the space 8c could attain the normal pressure again, it is necessary that a exhaust valve be provided which is not illustrated in detail.

The mirror according to FIG. 5 in all its parts is identical with those according to FIG. 1, however, there is a difference in that the conduit 6d which connects the hollow space 5d with the pump 7d contains an air filter 15 so that the air entering the hollow space 5d is surely free from dirt particles. In this embodiment the necessary exhaust valve is part of the pump 7d or is inserted into the conduit 6d.

The mirror according to FIG. 6 is essentially identical with that of FIG. 1, however, there is a difference in that instead of a plane parallel glass plate, in this case an optical lens and particularly a diverging lens 16 is used. The diverging lens 16 is capable of correcting any imaging errors produced by the concave mirror.

The mirror according to FIG. 7 differs from the mirror according to FIG. 1 only in that the deformable wall 3e is not directly connected with the frame portion 2e, but it is connected thereto by means of an elastic profile ring 17. Such profile ring 17 makes it possible that in case of an increasing pressure or a reduced pressure in the hollow space 5e, the deformable wall 3e will arch easier.

The necessary exhaust valve (not illustrated) may also in this case be arranged on the elastic profile ring. The valve can be constructed as a relief valve in which the valve seat is part of the profile ring while the valve body is constructed so that it can be reached from the outside by hand.

The mirror according to FIG. 8 differs from that of FIG. 1 only in that the deformable wall 3f here is constructed with varying thickness, more particularly, in the middle region x it is thicker than in the edge zone y. Such construction of the wall makes it possible that the foil during an increase of the pressure in the hollow space 5f will arch itself in a parabolic shape.

The embodiment according to FIG. 9 differs from that of FIG. 1 only in that all the walls 1g, 2g, 3g enclosing the hollow space 5g are made integrally and for example, from a transparent synthetic material, at least partially. This embodiment has the advantage that it is very economical in price.

The mirror according to FIG. 10 is substantially identical with that of FIG. 2, however, with the difference that instead of a plane parallel glass plate an optical lens 18 is used here against which the deformable wall 3h may lie when either the hollow space 5h becomes sufficiently evacuated or the pressure in the hollow space 8h has reached a certain level.

It is pointed out that the necessary pump to evacuate the hollow space or to increase the pressure in the hollow space can be either a similar bellows or a rubber ball, it can be, however, a reversible rotary pump, or as a piston pump. The deformable wall can be a metallic foil or a synthetic material, steel or elastic glass.

In the event the pump is a rubber ball (such as for example in the case of perfume atomizers is conventional), then it can be operated with the help of an operating screw pressing the rubber ball together.

It is also possible that the deformable wall is made from a reflecting material, for example, from polished steel, so that there will be no need for coating it with a mirror layer.

The mirror according to FIG. 11 consists of the glass plate 1h, a frame member 2h, a deformable wall 3h having a mirror layer 4h thereon which together enclose the hollow space 5h. It further consists of a pump 7h and a light bulb 19 having a rotatable filter disc 21. The light bulb 19 is screwed into a socket which in turn is securely connected to the frame 2h. It is essential in this embodiment that the sector 20 of the deformable wall 3h consists of a transparent material and is not covered with a reflecting layer so that the light rays coming from the bulb 19 will fall in the direction of the arrow onto the mirror-like object (not shown).

I claim:

1. A mirror having an adjustable focal length, said mirror comprising the combination of an elongated, tubular frame member, a first pair of wall members closing the ends of said frame member wherein at least one of said first pair of wall members is transparent, a second, flexible wall positioned within said frame member and having at least one reflecting surface on at least a portion thereof, said reflecting surface portion being in opposition to said transparent one of said first pair of wall members, said second flexible wall dividing said frame member into separate chambers, conduit means communicating directly with both said chambers and a reversible pump in communication with said conduit means whereby the gas volumes in said chambers can be pumped from one to the other for selectively producing controllable pressures in said chambers.

2. The mirror according to claim 1 wherein both said first pair of wall members are transparent.

3. The mirror according to claim 2 wherein said second, flexible wall has two oppositely facing reflective surfaces.

* * * * *